United States Patent
Chen et al.

(10) Patent No.: US 12,184,975 B2
(45) Date of Patent: Dec. 31, 2024

(54) FOCUS CHASING METHOD, FOCUS CHASING APPARATUS, ELECTRONIC DEVICE, AND STORAGE MEDIUM

(71) Applicant: Beijing Xiaomi Mobile Software Co., Ltd., Beijing (CN)

(72) Inventors: Hao Chen, Beijing (CN); Jie Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 73 days.

(21) Appl. No.: 18/051,427

(22) Filed: Oct. 31, 2022

(65) Prior Publication Data

US 2024/0007746 A1    Jan. 4, 2024

(30) Foreign Application Priority Data

Jul. 4, 2022    (CN) .......................... 202210788489.8

(51) Int. Cl.
*H04N 23/67* (2023.01)
*G06T 7/70* (2017.01)
*H04N 23/61* (2023.01)

(52) U.S. Cl.
CPC ............. *H04N 23/675* (2023.01); *G06T 7/70* (2017.01); *H04N 23/61* (2023.01)

(58) Field of Classification Search
CPC ...... H04N 23/675; H04N 23/61; H04N 23/67; G06T 7/70
See application file for complete search history.

(56) References Cited

U.S. PATENT DOCUMENTS

| 2009/0002516 A1* | 1/2009 | Suzuki | H04N 23/70 348/223.1 |
| 2023/0188833 A1* | 6/2023 | Pribble | G06T 7/12 348/242 |

FOREIGN PATENT DOCUMENTS

CN    110650291 B    6/2021

* cited by examiner

*Primary Examiner* — Yogesh K Aggarwal
(74) *Attorney, Agent, or Firm* — McCoy Russell LLP (57) ABSTRACT

A focus chasing method includes: determining a current preview picture from a target image acquired by a terminal; determining a position area of the current preview picture in the target image in response to determining that there is a target focus chasing object in the current preview picture; and performing focus chasing on the target focus chasing object in the current preview picture according to the position area.

20 Claims, 6 Drawing Sheets

Determining a current preview picture from a target image acquired by a terminal — 101

Determining a position area of the current preview picture in the target image in response to determining that there is a target focus chasing object in the current preview picture — 102

Performing focus chasing on the target focus chasing object in the current preview picture according to the position area — 103

FOCUS CHASING METHOD, FOCUS CHASING APPARATUS, ELECTRONIC DEVICE, AND STORAGE MEDIUM

CROSS REFERENCE TO RELATED APPLICATIONS

The present application claims priority to Chinese Patent Application No. 202210788489.8 filed on Jul. 4, 2022. The entire contents of the above-listed application are hereby incorporated by reference for all purposes.

BACKGROUND

The auto-focus-chasing function can support auto-focus-chasing on designated objects (such as people, cats, dogs, etc.). The function is very helpful for capturing in a moving scenario.

SUMMARY

According to a first aspect of examples of the disclosure, there is provided a focus chasing method, including:
  determining a current preview picture from a target image acquired by a terminal;
  determining a position area of the current preview picture in the target image in response to determining that there is a target focus chasing object in the current preview picture; and
  performing focus chasing on the target focus chasing object in the current preview picture according to the position area.

According to a second aspect of the examples of the disclosure, there is provided an electronic device, the device includes:
  a processor; and
  a memory for storing instructions executable by the processor;
  the processor is configured to implement the steps of the method in the first aspect above.

According to a third aspect of the examples of the disclosure, there is provided a non-transitory computer-readable storage medium on which computer program instructions are stored, the program instructions, when executed by a processor, implement the steps of the method in the first aspect above.

It should be understood that the above general description and the following detailed description are only illustrative and explanatory, and do not limit the disclosure.

BRIEF DESCRIPTION OF THE DRAWINGS

The accompanying drawings here, which are incorporated in and constitute a part of this description, illustrate examples consistent with the disclosure and, together with the description, serve to explain the principles of the disclosure.

DETAILED DESCRIPTION

Examples will be described in detail here, and their examples are shown in the accompanying drawings. When the following description refers to the drawings, unless otherwise indicated, the same number in different drawings indicates the same or similar elements. The examples described in the following examples do not represent all examples consistent with the disclosure. On the contrary, they are only examples of devices and methods consistent with some aspects of the disclosure as detailed herein.

It should be noted that all the actions of acquiring signals, information or data in the disclosure are carried out under the premise of complying with the corresponding data protection laws and policies of the country where they are located, and with the authorization of the corresponding apparatus owner.

The disclosure relates to the technical field of computers, and more particularly, to a focus chasing method, a focus chasing apparatus, an electronic device, and a storage medium.

The current auto-focus-chasing function can support auto-focus-chasing on designated objects (such as people, cats, dogs, etc.). The function is very helpful for capturing in a moving scenario. For example, when shooting children, pets, cats and dogs, the function can provide more accurate focusing, which can effectively avoid the phenomenon that the subject is interfered by the shallow depth of field due to focusing errors. However, the current auto-focus-chasing method is usually easy to lose the focus chasing target, in turn, the effect of automatic focus chasing cannot be achieved, which is not conducive to improving the user experience.

Before introducing the specific examples of the disclosure in detail, the disclosure scenarios of the disclosure are described below. The disclosure can be applied to terminals with video recording functions, such as cameras, video cameras, mobile phones, tablets, telephone watches, bracelets, etc. Focus chasing, as the name implies, is to follow the moving object for shooting and continuous object tracking. It is necessary to follow the movement of the shooting object for continuous focusing to ensure that the camera and object are in a relatively static state. In order to improve the shooting effect of the terminal, in relevant technologies, the auto-focus-chasing function is used to automatically chase the focuses of the specified objects (such as people, cats, dogs, etc.), so that in the motion scenario, more accurate focusing can be provided for the specified objects. However, the current automatic focus chasing methods usually input the focus chasing algorithm, the image used for focus chasing is the whole image collected by the camera, and the preview picture is obtained after cropping the whole image. Because the size of the focus chasing image is different from that of the preview image, during the lens switching process (for example, the wide-angle camera is switched into the ultra wide-angle camera), due to the change of the image sent into the focus chasing algorithm, the field of view during focus chasing will change greatly, so it is easy to lose the focus chasing target, in turn, the purpose of effective focus chasing cannot be achieved, which is not conducive to improving the user experience.

In order to solve the above technical problem, the disclosure provides a focus chasing method, a focus chasing apparatus, an electronic device, and a storage medium, the method includes: determining a current preview picture from a target image acquired by a terminal; determining a position area of the current preview picture in the target image in response to determining that there is a target focus chasing object in the current preview picture; and performing focus chasing on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

Figure 1:
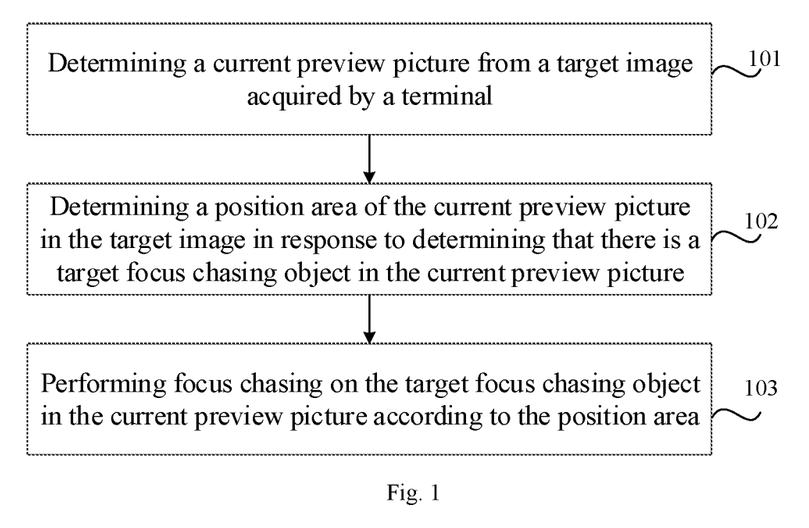
FIG. 1 is a flow diagram of a focus chasing method shown in an example of the disclosure.

FIG. 1 is a flow diagram of a focus chasing method shown in an example of the disclosure; as shown in FIG. 1, the method may include:

Step 101, a current preview picture is determined from a target image acquired by a terminal.

The terminal can be a mobile phone, a tablet computer, a telephone watch, a camera, a bracelet, etc. The target image can be an image output by an IFE (Image front end), or an original image collected by a terminal camera.

In the step, in one possible example, the current preview ratio can be obtained; the preview ratio is the ratio of the width and height of the preview picture, for example, 1:1, 4:3, 16:9, etc. The current preview picture corresponding to the target image is determined according to the preview ratio. For example, when the preview ratio is 4:3, the target image is cropped to obtain the current preview picture with a preview ratio of 4:3.

In another possible example, the preview picture specification set in advance can be acquired by the user. The preview picture specification can be 1 inch, 2 inches or 8 inches, and the current preview picture corresponding to the target image is determined according to the preview picture specification.

Step 102, a position area of the current preview picture in the target image is determined in response to determining that there is a target focus chasing object in the current preview picture.

In the step, the position area of the current preview picture in the target image is determined described above can be:
   position coordinates of each pixel in the current preview picture in the target image are acquired; and the position area is determined according to the position coordinates of each pixel in the target image.

Figure 2:
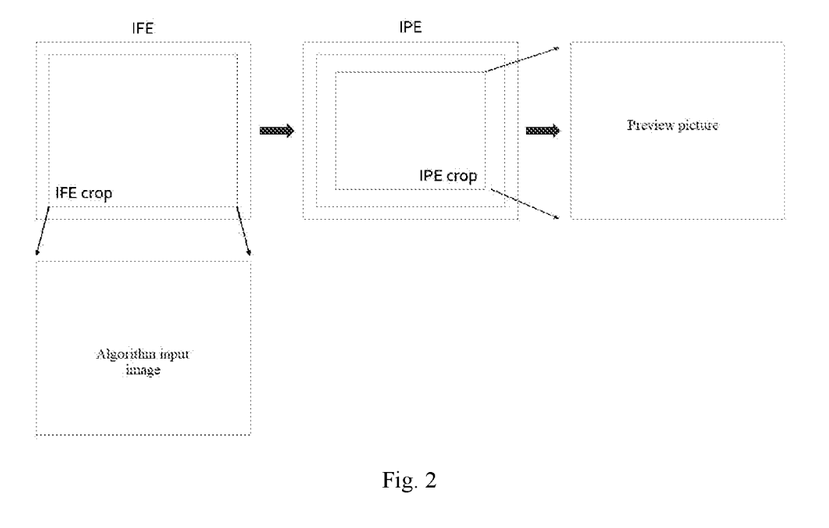
FIG. 2 is a schematic diagram of a preview picture generation process shown in an example of the disclosure.

It should be noted that the current preview picture can be an image cropped by an IPE (Image process engine); as shown in FIG. 2, FIG. 2 is a schematic diagram of a preview picture generation process shown in an example of the disclosure. In the image preview process, the IFE first preprocesses the original image captured by the camera, and then the IPE crops the preprocessed image (that is, the algorithm input image, which is sent to the preset focus chasing algorithm for chasing the focus of the target focus chasing object) output by the IFE. Thus, the current preview picture can be obtained. The image pre-processing can include at least one of cropping, calibration and compensation.

In the step, the example of determining that there is a target focus chasing object in the current preview picture can be:
   the current preview picture is input into a preset recognition model to acquire an object recognition result output by the preset recognition model, the object recognition result including a positive result and a negative result; and in response to determining that the object recognition result is the positive result, it is determined that the target focus chasing object exists in the current preview picture. During the pursuit of the target focus chasing object, a focus box is displayed that moves with the target focus chasing object.

The preset recognition model can be a neural network model used to identify the target focus chasing object, and the target focus chasing object can be a person, a bird, a cat, a dog and other easily moving shooting objects. The preset recognition model can be trained in the following way: acquiring a plurality of sample images, training the preset initial model to obtain the preset recognition model by using the plurality of sample images as training data, the training data including label data of the target focus chasing object.

Step 103, focus chasing is performed on the target focus chasing object in the current preview picture according to the position area.

In the step, the position area and the target image may be inputted into a preset focus chasing algorithm to acquire target position information of the target focus chasing object in the current preview picture output by the preset focus chasing algorithm.

It should be noted that with the constant increase of a zoom ratio, the FOV (Field Of View) of the current preview picture becomes smaller and smaller. When the zoom ratio reaches the upper limit of the current lens, the current lens is switched to another lens (for example, the ultra-wide-angle lens is switched to the wide-angle lens). At this time, the preview picture (i.e., the current preview picture) will remain unchanged, but the original image collected by the lens and the image output by the IPE will change, according to the solutions of related technologies, only the original image or the image output by the IFE is sent to the preset focus chasing algorithm, and focus chasing is performed in the original image or the image output by the IFE, then when the lens is switched, because the image sent to the preset focus chasing algorithm changes greatly, the field of view for focus chasing will also change greatly, so it is easy to lose the focus chasing target; in the step of the disclosure, the position area and the target image are input into the preset focus chasing algorithm to enable the preset focus chasing algorithm to perform focus chasing within the position area. In the process of lens switching, since the current preview picture remains unchanged, the problem of large changes in the field of view for focus chasing will not be caused, so that the phenomenon of losing the focus chasing object can be effectively avoided.

In addition, it should be noted that the preset focus chasing algorithm can be any focus chasing algorithm in the prior art, which is not limited in the disclosure.

The above technical solutions can determine a position area of the current preview picture in the target image in response to determining that there is a target focus chasing object in the current preview picture; and perform focus chasing on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

Figure 3:
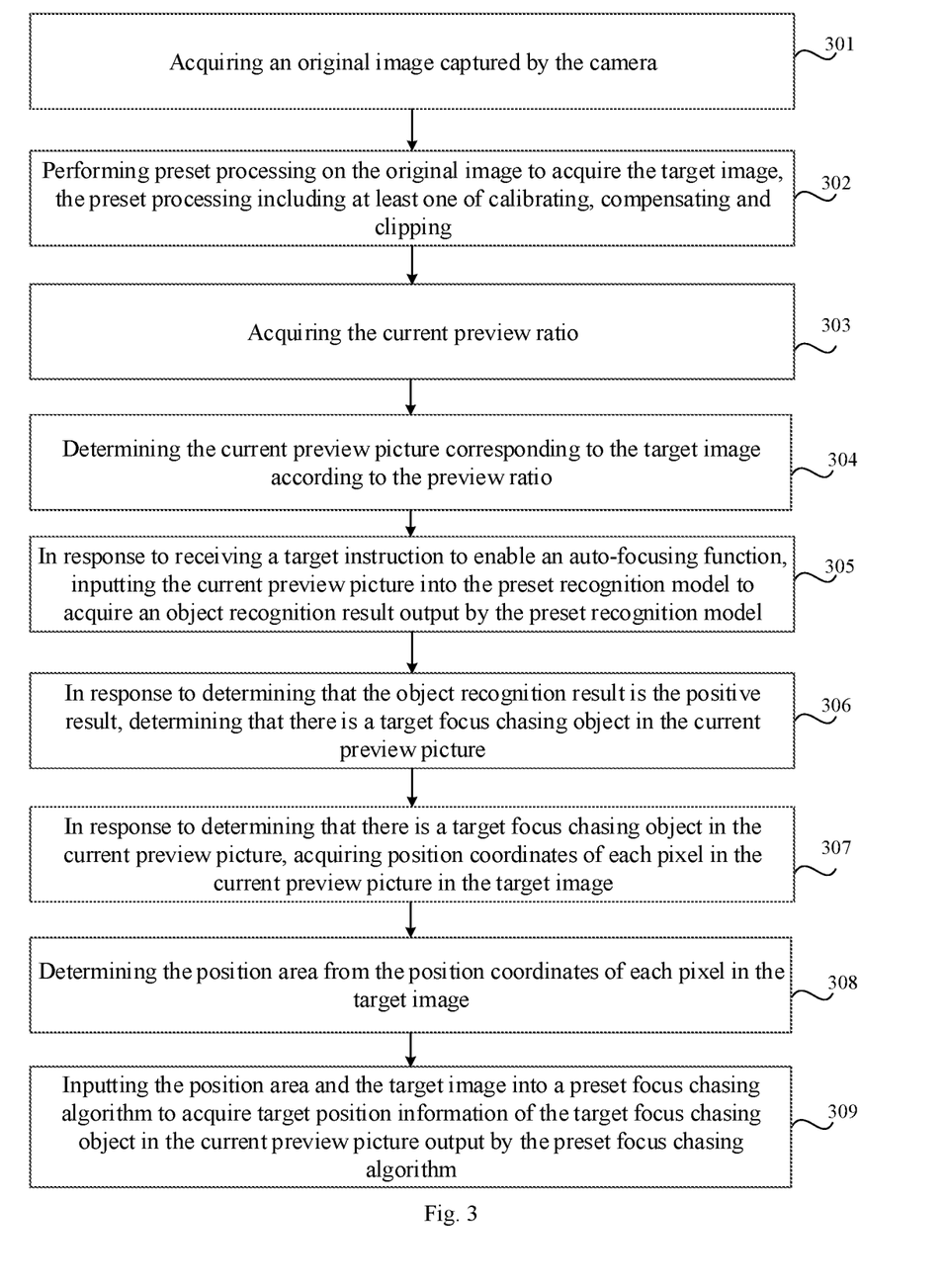
FIG. 3 is a flow diagram of the focus chasing method shown in another example of the disclosure.

FIG. 3 is a flow diagram of the focus chasing method shown in another example of the disclosure; as shown in FIG. 3, the focus chasing method is applied to a terminal, the terminal includes a camera, and the method may include:

Step 301, an original image captured by the camera is acquired.

Step 302, preset processing is performed on the original image to acquire the target image, the preset processing including at least one of calibration, compensation and clipping.

The calibration of the original image can be any image calibration method in the prior art, and the compensation of the original image can also be any image compensation method in the prior art, which is not limited in the disclosure. The target image can be the image output by the IFE or the original image collected by the terminal camera.

Step 303, the current preview ratio is acquired.

In the step, the preview ratio is the width and height ratio of the preview picture, and may be, for example, 1:1, 4:3, 16:9, or the like.

Step 304, the current preview picture corresponding to the target image is determined according to the preview ratio.

For example, when the preview ratio is 4:3, the target image is cropped to obtain a current preview picture with a preview ratio of 4:3.

Step 305, in response to receiving a target instruction to enable an auto-focusing function, the current preview picture is input into the preset recognition model to acquire an object recognition result output by the preset recognition model.

The target instruction can be automatically triggered when the camera is turned on, or manually triggered by the user as needed. The object recognition results include a positive result and a negative result.

For example, if the data output by the preset recognition model is the probability of whether there is a target focus chasing object, if the probability is greater than a preset probability threshold, the object recognition result is determined to be a positive result; when the probability is less than or equal to the preset probability threshold, the object recognition result is determined to be a negative result.

Step 306, in response to determining that the object recognition result is the positive result, it is determined that there is a target focus chasing object in the current preview picture.

Step 307, in response to determining that there is a target focus chasing object in the current preview picture, position coordinates of each pixel in the current preview picture in the target image are acquired.

In the step, a target pixel corresponding to each pixel in the current preview picture may be found in the target image, and then the pixel coordinates of the target pixel are acquired to obtain the position coordinates of each pixel in the target image. The target pixel is the pixel in the target image corresponding to a pixel in the current preview picture.

Step 308, the position area is determined from the position coordinates of each pixel in the target image.

In the step, an area where each position coordinate is located may be used as the position area.

Step 309, the position area and the target image are input into a preset focus chasing algorithm to acquire target position information of the target focus chasing object in the current preview picture output by the preset focus chasing algorithm.

The preset focus chasing algorithm may be any one of the focus chasing algorithms in the prior art, which is not limited in the disclosure.

The above technical solution is capable of determining a position area of the current preview picture in the target image in response to determining that there is a target focus chasing object in the current preview picture; and performing focus chasing on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

Figure 4:
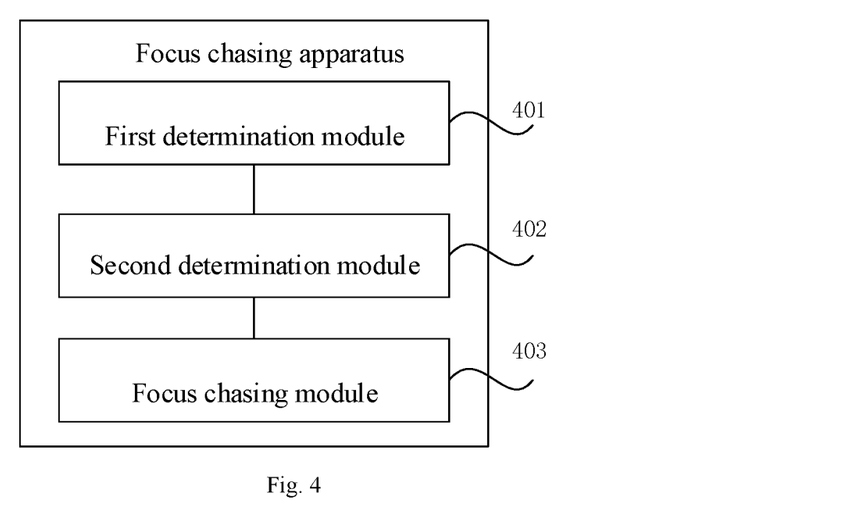
FIG. 4 is a block diagram of a focus chasing apparatus shown in an example of the disclosure.

FIG. 4 is a block diagram of a focus chasing apparatus shown in an example of the disclosure, as shown in FIG. 4, the apparatus can include:

a first determination module 401, configured to determine a current preview picture from a target image acquired by a terminal;

a second determination module 402, configured to determine a position area of the current preview picture in the target image in response to determining that there is a target focus chasing object in the current preview picture; and a focus chasing module 403, configured to perform focus chasing on the target focus chasing object in the current preview picture according to the position area.

The above technical solution is capable of determining a position area of the current preview picture in the target image in response to determining that there is a target focus chasing object in the current preview picture; and performing focus chasing on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

In an example, the second determination module 402 is configured to:

acquire position coordinates of each pixel in the current preview picture in the target image; and determine the position area according to the position coordinates of each pixel in the target image.

In an example, the focus chasing module 403 is configured to:

input the position area and the target image into a preset focus chasing algorithm to acquire target position information of the target focus chasing object in the current preview picture output by the preset focus chasing algorithm.

In an example, the second determination module 402 is configured to:

input the current preview picture into a preset recognition model to acquire an object recognition result output by the preset recognition model, the object recognition result including a positive result and a negative result; and in response to determining that the object recognition result is the positive result, determine that the target focus chasing object exists in the current preview picture.

In an example, the second determination module 402 is configured to:

in response to receiving a target instruction to enable an auto-focusing function, input the current preview picture into the preset recognition model.

In an example, the first determination module 401 is configured to:

acquire a current preview ratio; and determine the current preview picture corresponding to the target image according to the preview ratio.

Figure 5:
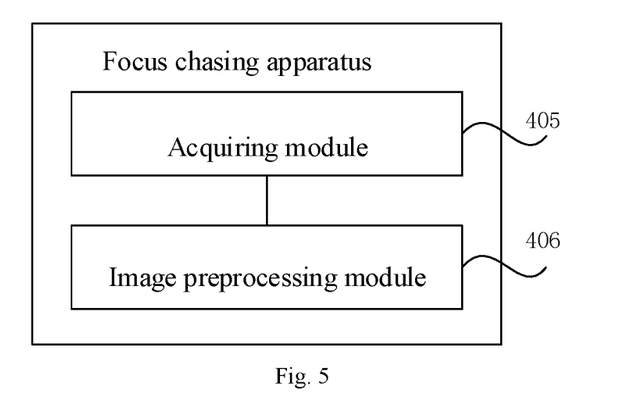
FIG. 5 is a block diagram of the focus chasing apparatus shown according to the example shown in FIG. 4.

In an example, FIG. 5 is a block diagram of the focus chasing apparatus shown according to the example shown in FIG. 4; as shown in FIG. 5, the terminal includes a camera, the apparatus further includes:

an acquiring module 404, configured to acquire an original image captured by the camera; and an image preprocessing module 405, configured to perform preset processing on the original image to acquire the target image, the preset processing including at least one of calibration, compensation and cropping.

The above technical solution is capable of determining a position area of the current preview picture in the target image in response to determining that there is a target focus chasing object in the current preview picture; and performing focus chasing on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

With respect to the apparatus in the above example, the specific mode of each module to perform operations has been described in detail in the example of the method, and will not be described in detail here.

The disclosure also provides a non-transitory computer-readable storage medium, on which computer program instructions are stored. When the program instructions are executed by the processor, the steps of the focus chasing method provided by the disclosure are realized.

Figure 6:
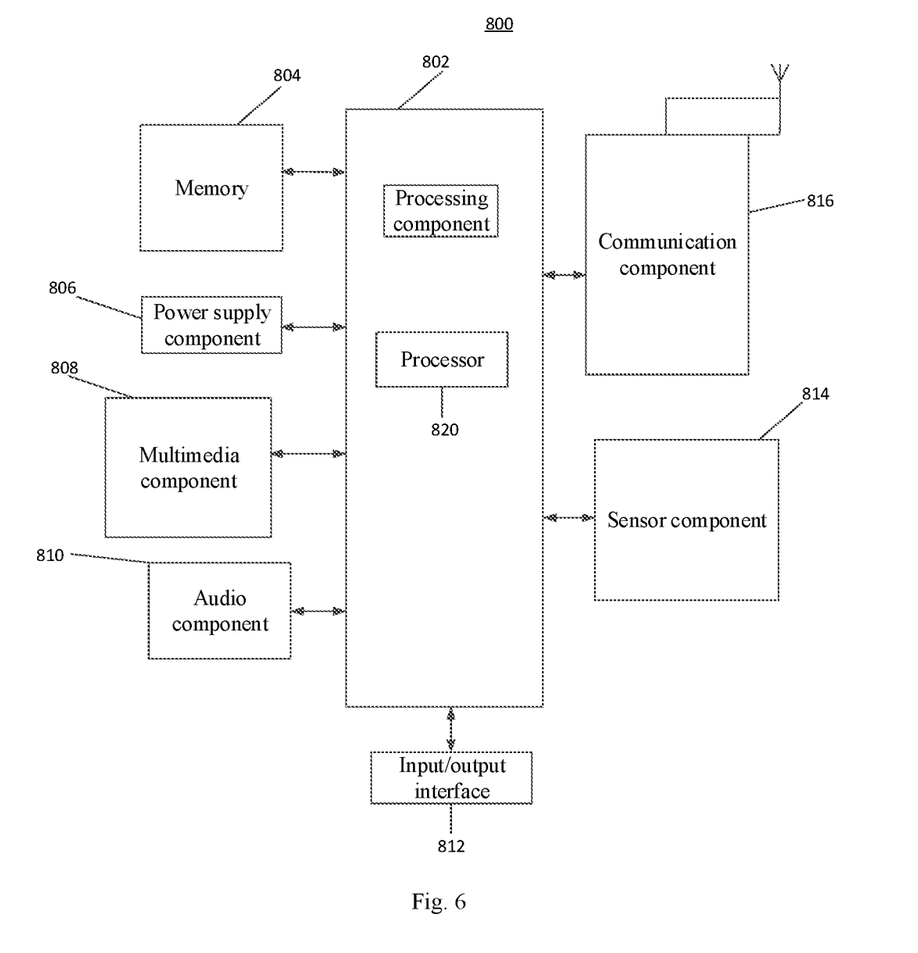
FIG. 6 is a block diagram of an electronic device shown according to an example.

FIG. 6 is a block diagram of an electronic device shown according to an example. For example, the apparatus 800 can be a mobile phone, a computer, a digital broadcasting terminal, a message receiving and sending device, a game console, a tablet device, a medical device, a fitness device, a personal digital assistant, and the like.

Referring to FIG. 6, the apparatus 800 may include one or more of the following components: a processing component 802, a memory 804, a power supply component 806, a multimedia component 808, an audio component 810, an input/output interface 812, a sensor component 814, and a communication component 816.

The processing component 802 typically controls the overall operation of the electronic device 800, such as operations associated with display, telephone call, data communication, a camera operation, and a recording operation. The processing component 802 may include one or more processors 820 to execute instructions to complete all or part of the steps of the above method. In addition, the processing component 802 may include one or more modules to facilitate interactions between the processing component 802 and other components. For example, the processing component 802 may include a multimedia module to facilitate interaction between the multimedia component 808 and the processing component 802.

The memory 804 is configured to store various types of data to support operations at the electronic device 800. Examples of such data include instructions, contact data, phone book data, messages, pictures, videos, and the like for any disclosure or method operating on the electronic device 800. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read only memory (PROM), a read-only memory (ROM), a magnetic memory, a flash memory, a disk or an optical disk.

The power supply assembly 806 provides power for various components of the electronic device 800. The power component 806 may include a power management system, one or more power supplies, and other components associated with power generating, managing, and distributing for the electronic device 800.

The multimedia component 808 includes a screen providing an output interface between the electronic device 800 and the user. In some examples, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding, and gestures on the touch panel. The touch sensor may not only sense the boundary of a touch or slide operation, but also detect the duration and pressure associated with the touch or slide operation. In some examples, the multimedia component 808 includes a front camera and/or a rear camera. When the electronic device 800 is in an operation mode, such as a shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC), which is configured to receive an external audio signal when the electronic device 800 is in an operation mode, such as a call mode, a recording mode, and a voice recognition mode. The received audio signal may be further stored in the memory 804 or transmitted via the communication component 816. In some examples, the audio component 810 also includes a speaker for outputting the audio signal.

The input/output interface 812 provides an interface between the processing component 802 and the peripheral interface module, and the peripheral interface module can be a keyboard, a click wheel, a button, etc. These buttons may include, but are not limited to, the Home button, the Volume button, the Start button, and the Lock button.

The sensor assembly 814 includes one or more sensors for providing status evaluation of various aspects for the electronic device 800. For example, the sensor assembly 814 can detect the open/closed state of the electronic device 800, the relative positioning of the components, for example, the components are the display and keypad of the electronic device 800. The sensor assembly 814 can also detect the position change of the electronic device 800 or one component of the electronic device 800, the presence or absence of the user's contact with the electronic device 800, the orientation or acceleration/deceleration of the electronic device 800, and the temperature change of the electronic device 800. The sensor assembly 814 may include a proximity sensor configured to detect the presence of nearby objects without any physical contact. The sensor assembly 814 may also include a light sensor, such as a CMOS or CCD image sensor, for use in imaging disclosures. In some examples, the sensor assembly 814 may also include an acceleration sensor, a gyroscope sensor, a magnetic sensor, a pressure sensor or a temperature sensor.

The communication component 816 is configured to facilitate wired or wireless communication between the electronic device 800 and other devices. The electronic device 800 may access a wireless network based on a communication standard, such as WiFi, 2G or 3G, or their combination. In an example, the communication component 816 receives a broadcast signal or broadcast related information from an external broadcast management system via a broadcast channel. In an example, the communication component 816 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In an example, the electronic device 800 may be implemented by one or more disclosure specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above focus chasing method.

In the example, a non-temporary computer-readable storage medium including instructions is also provided, such as a memory 804 including instructions, which can be executed by the processor 820 of the electronic device 800 to complete the above focus chasing method. For example, the non-temporary computer-readable storage medium can be a ROM, a random access memory (RAM), a CD-ROM, a tape, a floppy disk, an optical data storage device, etc.

In another example, a computer program product is also provided. The computer program product includes a computer program that can be executed by a programmable apparatus. The computer program has a code portion for executing the above focus chasing method when executed by the programmable apparatus.

Other examples of the disclosure will readily occur to those skilled in the art upon consideration of the specification and practice of the disclosure. The disclosure is intended to cover any variations, uses, or adaptations of the disclosure that follow the general principles of the disclosure and include common sense or conventional techniques in the art that are not disclosed in the disclosure.

It should be understood that the disclosure is not limited to the precise structure already described above and shown in the drawings, and various modifications and changes can be made without departing from its scope.

According to a first aspect of examples of the disclosure, there is provided a focus chasing method, including:
  determining a current preview picture from a target image acquired by a terminal;
  determining a position area of the current preview picture in the target image in response to determining that there is a target focus chasing object in the current preview picture; and
  performing focus chasing on the target focus chasing object in the current preview picture according to the position area.

In an example, determining the position area of the current preview picture in the target image includes:
  acquiring position coordinates of each pixel in the current preview picture in the target image; and
  determining the position area according to the position coordinates of each pixel in the target image.

In an example, performing focus chasing on the target focus chasing object in the current preview picture according to the position area includes:
  inputting the position area and the target image into a preset focus chasing algorithm to acquire target position information of the target focus chasing object in the current preview picture output by the preset focus chasing algorithm.

In an example, determining that there is the target focus chasing object in the current preview picture includes:
  inputting the current preview picture into a preset recognition model to acquire an object recognition result output by the preset recognition model, the object recognition result including a positive result and a negative result; and
  in response to determining that the object recognition result is the positive result, determining that the target focus chasing object exists in the current preview picture.

In an example, inputting the current preview picture into the preset recognition model includes:
  in response to receiving a target instruction to enable an auto-focusing function, inputting the current preview picture into the preset recognition model.

In an example, determining the current preview picture from the target image acquired by the terminal includes:
  acquiring a current preview ratio; and
  determining the current preview picture corresponding to the target image according to the preview ratio.

In an example, the terminal includes a camera, and before determining the current preview picture from the target image acquired by the terminal, the method further includes:
  acquiring an original image captured by the camera; and
  performing preset processing on the original image to acquire the target image, the preset processing including at least one of calibration, compensation and cropping.

According to a second aspect of the examples of the disclosure, there is provided a focus chasing apparatus, including:
  a first determination module, configured to determine a current preview picture from a target image acquired by a terminal;
  a second determination module, configured to determine a position area of the current preview picture in the target image in response to determining that there is a target focus chasing object in the current preview picture; and
  a focus chasing module, configured to perform focus chasing on the target focus chasing object in the current preview picture according to the position area.

In an example, the second determination module is configured to:

acquire position coordinates of each pixel in the current preview picture in the target image; and determine the position area according to the position coordinates of each pixel in the target image.

In an example, the focus chasing module is configured to:

input the position area and the target image into a preset focus chasing algorithm to acquire target position information of the target focus chasing object in the current preview picture output by the preset focus chasing algorithm.

In an example, the second determination module is configured to:

input the current preview picture into a preset recognition model to acquire an object recognition result output by the preset recognition model, the object recognition result including a positive result and a negative result; and in response to determining that the object recognition result is the positive result, determine that the target focus chasing object exists in the current preview picture.

In an example, the second determination module is configured to:

in response to receiving a target instruction to enable an auto-focusing function, input the current preview picture into the preset recognition model.

In an example, the first determination module is configured to:

acquire a current preview ratio; and determine the current preview picture corresponding to the target image according to the preview ratio.

In an example, the terminal includes a camera, the apparatus further includes:

an acquiring module, configured to acquire an original image captured by the camera; and an image preprocessing module, configured to perform preset processing on the original image to acquire the target image, the preset processing including at least one of calibration, compensation and cropping.

According to a third aspect of the examples of the disclosure, there is provided an electronic device, the device includes:

a processor; and a memory for storing instructions executable by the processor;

the processor is configured to implement the steps of the method in the first aspect above.

According to a fourth aspect of the examples of the disclosure, there is provided a non-transitory computer-readable storage medium on which computer program instructions are stored, the program instructions, when executed by a processor, implement the steps of the method in the first aspect above.

The technical solution provided by the examples of the disclosure can include the following beneficial effects:

the position area of the current preview picture in the target image can be determined in response to determining that there is a target focus chasing object in the current preview screen; focus chasing is performed on the target focus chasing object in the current preview picture according to the position area. In this way, by performing focus chasing on the target focus tracking object within the position area of the current preview picture, the phenomenon of losing the focus tracking target due to large changes in the field of view during camera switching can be effectively avoided, the probability of losing the focus tracking target can be effectively reduced, and the accuracy of the focus tracking result can be improved, thus effectively improving the image shooting effect and improving the user shooting experience.

The invention claimed is:

1. A focus chasing method, comprising:

determining a current preview picture from a target image acquired by a terminal;

determining a position area of the current preview picture in the target image in response to determining that there is a target focus chasing object in the current preview picture; and performing focus chasing on the target focus chasing object in the current preview picture according to the position area, wherein determining the current preview picture from the target image acquired by the terminal comprises:

determining, from the target image captured by a second lens, a current preview picture corresponding to a preview image in a first lens before the switch, in response to determining a switch from the first lens to the second lens.

2. The focus chasing method according to claim 1, wherein determining the position area of the current preview picture in the target image comprises:

acquiring position coordinates of each pixel in the current preview picture in the target image; and determining the position area according to the position coordinates of each pixel in the target image.

3. The focus chasing method according to claim 1, wherein performing focus chasing on the target focus chasing object in the current preview picture according to the position area comprises:

inputting the position area and the target image into a preset focus chasing algorithm to acquire target position information of the target focus chasing object in a current preview picture output by the preset focus chasing algorithm.

4. The focus chasing method according to claim 1, wherein determining that there is the target focus chasing object in the current preview picture comprises:

inputting the current preview picture into a preset recognition model to acquire an object recognition result output by the preset recognition model, the object recognition result comprising a positive result and a negative result; and in response to determining that the object recognition result is the positive result, determining that the target focus chasing object exists in the current preview picture.

5. The focus chasing method according to claim 4, wherein inputting the current preview picture into the preset recognition model comprises:

in response to receiving a target instruction to enable an auto-focusing function, inputting the current preview picture into the preset recognition model.

6. The focus chasing method according to claim 1, wherein determining the current preview picture from the target image acquired by the terminal comprises:

acquiring a current preview ratio; and determining the current preview picture corresponding to the target image according to the current preview ratio.

7. The focus chasing method according to claim 1, wherein the terminal comprises a camera, and before determining the current preview picture from the target image acquired by the terminal, the focus chasing method further comprises:

acquiring an original image captured by the camera; and performing preset processing on the original image to acquire the target image, the preset processing comprising at least one of calibration, compensation and cropping.

8. An electronic device, comprising:

a processor; and a memory for storing instructions executable by the processor;

wherein the processor is configured to:

determine a current preview picture from a target image acquired by a terminal;

determine a position area of the current preview picture in the target image in response to determining that there is a target focus chasing object in the current preview picture;

perform focus chasing on the target focus chasing object in the current preview picture according to the position area; and determine, from the target image captured by a second lens, a current preview picture corresponding to a preview image in a first lens before the switch, in response to determining a switch from the first lens to the second lens.

9. The electronic device according to claim 8, wherein the processor is further configured to:

acquire position coordinates of each pixel in the current preview picture in the target image; and determine the position area according to the position coordinates of each pixel in the target image.

10. The electronic device according to claim 8, wherein the processor is further configured to:

input the position area and the target image into a preset focus chasing algorithm to acquire target position information of the target focus chasing object in a current preview picture output by the preset focus chasing algorithm.

11. The electronic device according to claim 8, wherein the processor is further configured to:

input the current preview picture into a preset recognition model to acquire an object recognition result output by the preset recognition model, the object recognition result comprising a positive result and a negative result; and in response to determining that the object recognition result is the positive result, determine that the target focus chasing object exists in the current preview picture.

12. The electronic device according to claim 11, wherein the processor is further configured to:

in response to receiving a target instruction to enable an auto-focusing function, input the current preview picture into the preset recognition model.

13. The electronic device according to claim 8, wherein the processor is further configured to:

acquire a current preview ratio; and determine the current preview picture corresponding to the target image according to the current preview ratio.

14. The electronic device according to claim 8, wherein the processor is further configured to:

acquire an original image captured by a camera; and perform preset processing on the original image to acquire the target image, the preset processing comprising at least one of calibration, compensation and cropping.

15. A non-transitory computer-readable storage medium, on which computer program instructions are stored, wherein the computer program instructions, when executed by a processor, implement:

determining a current preview picture from a target image acquired by a terminal;

determining a position area of the current preview picture in the target image in response to determining that there is a target focus chasing object in the current preview picture;

performing focus chasing on the target focus chasing object in the current preview picture according to the position area, wherein determining the current preview picture from the target image acquired by the terminal comprises:

determining, from the target image captured by a second lens, a current preview picture corresponding to a preview image in a first lens before the switch, in response to determining a switch from the first lens to the second lens.

16. The non-transitory computer-readable storage medium according to claim 15, wherein the computer program instructions further implement:

acquiring position coordinates of each pixel in the current preview picture in the target image; and determining the position area according to the position coordinates of each pixel in the target image.

17. The non-transitory computer-readable storage medium according to claim 15, wherein the computer program instructions further implement:

inputting the position area and the target image into a preset focus chasing algorithm to acquire target position information of the target focus chasing object in a current preview picture output by the preset focus chasing algorithm.

18. The non-transitory computer-readable storage medium according to claim 15, wherein the computer program instructions further implement:

inputting the current preview picture into a preset recognition model to acquire an object recognition result output by the preset recognition model, the object recognition result comprising a positive result and a negative result; and in response to determining that the object recognition result is the positive result, determining that the target focus chasing object exists in the current preview picture.

19. The non-transitory computer-readable storage medium according to claim 18, wherein the computer program instructions further implement:

in response to receiving a target instruction to enable an auto-focusing function, inputting the current preview picture into the preset recognition model.

20. The non-transitory computer-readable storage medium according to claim 15, wherein the computer program instructions further implement:

acquiring a current preview ratio; and determining the current preview picture corresponding to the target image according to the current preview ratio.

* * * * *